Nov. 25, 1958 J. VERES 2,861,727
FISH STRINGER
Filed April 6, 1956
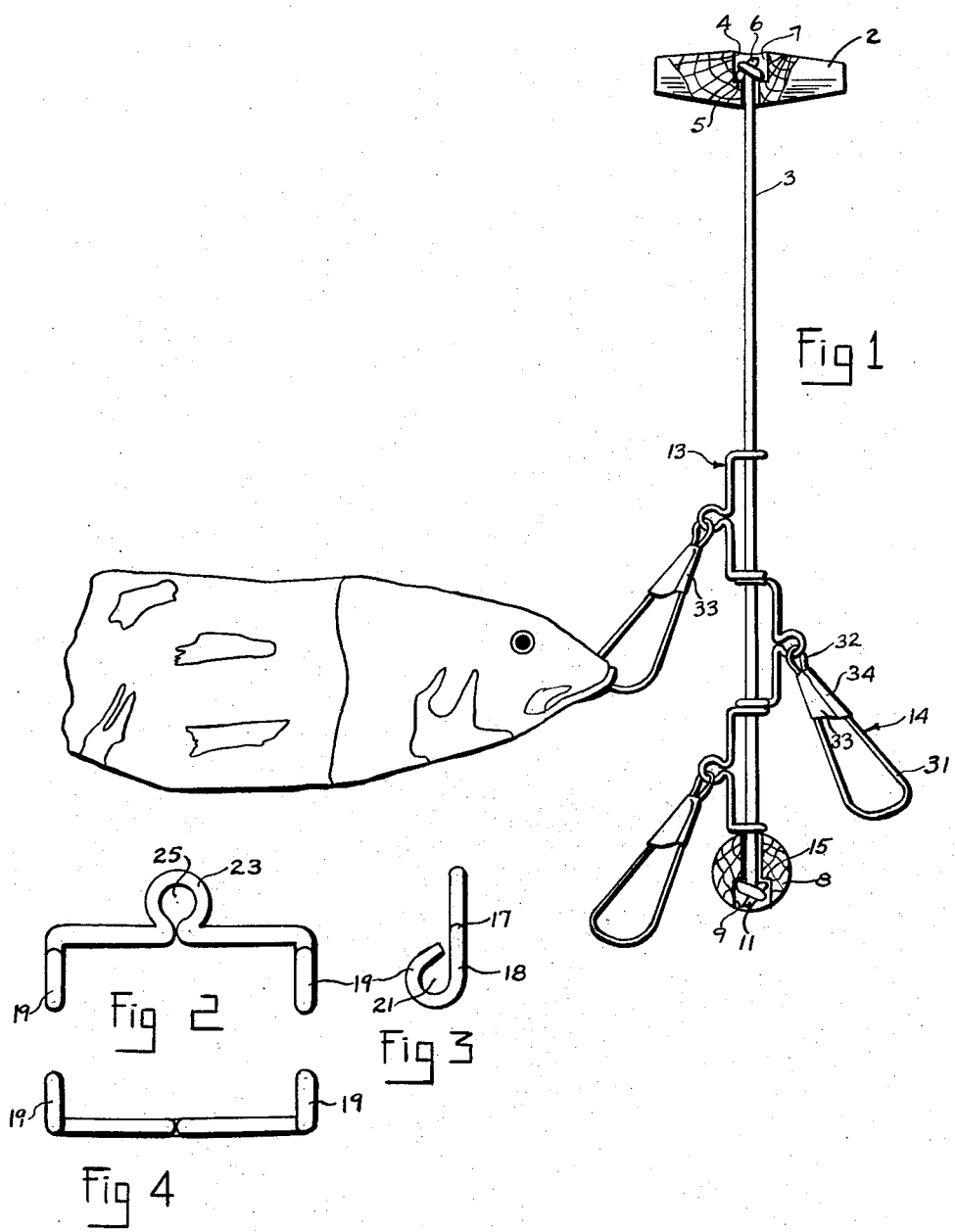
INVENTOR.
JOHN VERES
BY
*Richard J. Egan*
His ATTY

United States Patent Office 2,861,727
Patented Nov. 25, 1958

2,861,727

FISH STRINGER

John Veres, Cleveland, Ohio

Application April 6, 1956, Serial No. 576,720

3 Claims. (Cl. 224—7)

This invention relates to fish stringers and more particularly to a novel structure thereof, which permits attachment of fish subsequently caught without the necessity of removing the stringer and fish already secured thereto from the water.

The prior art devices include those which must be partially or entirely withdrawn from the water each time a fish is desired to be attached thereto. This particular structural requirement tends to injure the fish already attached to said stringer resulting in either their death or possible escapement.

Still another class of device provides means whereby presently caught fish may be independently attached thereto without having to remove prior caught fish from the water.

The present invention relates to a novel structure of the latter class, and an advantage thereof over said prior devices is, that it is extremely simple in construction and economical in manufacture.

Another advantage is that the movable elements of the fish stringer present the least surface area to associated stationary elements thereof whereby the frictional forces created are minimized.

Still another advantage is that the present device is very light in structure but partakes of sufficient strength to adequately secure a plurality of fish of various size and weight.

Other advantages will be obvious herefrom and a more comprehensive understanding thereof will be obtained by reference made to the accompanying drawings, being a part of this specification and in which:

Fig. 1 is an elevational view of a fish stringer embodying the features of the present invention;

Fig. 2 is a plan view of a hook spacer of the present device;

Fig. 3 is a side view thereof; and

Fig. 4 is a bottom view of the hook spacer.

Referring now to the drawings throughout which like elements are designated by like reference characters, the numeral 3 denotes a flexible line, such as nylon cord, having a smooth outer surface.

The upper end of the line 3 is attached to a generally tubular shaped handle 2 having a stepped aperture 4 defining an annular intermediate flange 5 and into which the end of the line is inserted. A knot 6 is formed on the extremity of the upper end of said cord being disposed within the upper enlarged portion 7 of said aperture and in engagement with the flange 5.

The line 3 may be of any desired length, being sufficient to support a number of hook spacers 13 and attached hook members 14.

A spherical shaped stop 8, formed of any suitable material such as cork or wood, and having a stepped aperture 9, defining an annual intermediate flange 15, is attached to the lower end of the line 3 opposite to the handle 2. A knot 11 formed on the extremity of said opposite end, is disposed within the enlarged portion 16 of said stepped aperture 9 and is in engagement with flange 15.

The portion of said line disposed between said handle 2 and stop 8 provide a continuous smooth support for a plurality of hook spacers 13 and fish attaching members 14, to be presently described.

The hook spacer 13 per se, Figs. 2–4, comprises a thin smooth rod-like member, generally C-shaped in configuration, comprising an elongated central portion 17, and arm members 18 formed integrally on the ends of said portion 17, and extending perpendicularly therefrom.

The extremity of each arm member 18 is formed into an outwardly extending, substantially closed circular eyelet 19. The center of the opening 21 defined by each eyelet 19 is equally spaced from the longitudinal axis of the central portion 17.

Intermediate the arm members 18, the central portion 17 is curved upwardly and then downward to form a longitudinally extending, substantially circular closed eyelet 23, defining an opening 25. The eyelets 19 on arm members 18 are disposed in a plane substantially perpendicular to the plane of eyelet 23, and below said eyelet 23 as depicted in Fig. 2.

The fish attaching means 14 may comprise of any well known configuration and for purposes of illustration may be fabricated of an elastic metallic material bent into a loop-shaped body 31, Fig. 1. An eyelet 32, formed on one end of said body 31 is adapted to be linked to eyelet 23 on hook spacer 13. A clasp 33 is secured to the body adjacent to eyelet 32 and is formed with an elongated slot adapted to receive the opposite end 35 of body 31.

In assembling said fish stringer, the stop 8 is attached to the lower end of cord 3, Fig. 1. The free end of said cord is then passed through each eyelet 19 on arm members 18, extending freely therethrough. Any desired number of hook spacers may be threaded upon cord 3, after which the handle 2 is attached to the upper end of said cord.

The lower arm member 18 of the first hook spacer placed upon said cord, abuts against the stop 8, and the lower arm member 18 of the next succeeding hook spacer abuts against the upper arm member 18 of said first hook spacer. This same relationship exists between all of said hook spacers whereby the fish attaching means 14 are disposed in spaced relationship to each other.

In use, the handle 2 may be attached to a portion of the fishing vessel or other similar operative means convenient to the fisherman. The hook spacers 13 and fish attaching means 14 are freely slidable toward the upper end of cord 3, and placed into said vessel within reach of said fisherman for his subsequent need thereof. The stop 8 and lower end of the attached cord may be then dropped into the water. Upon a fish being caught, it is placed upon the first fish attaching means linked to said first hook spacer 13. The hook spacer is then slid over said cord until it abuts against the stop 8 whereby it is capable of movement sufficient to sustain the life of said captured fish. The next fish being caught, is placed upon the next succeeding attaching means 14 and said associated hook spacer 13 is slid downward over said cord until it abuts the next lower hook spacer.

It is therefore realized that the prior caught fish need not be disturbed, and that the novel hook spacer prevents said fish from becoming entangled while providing adequate freedom of movement.

Having thus described my invention, I realize that numerous departures may be made therefrom without departing from the true scope or spirit thereof.

I claim:

1. For use with a fish stringer having a cord or the like, hook means, and means connecting the hook means to said stringer, comprising an elongated thin rod-like body having an integrally connected arm member on each end thereof and in perpendicular extension therefrom, a circular, substantially closed eyelet formed on the end of each arm member through which the cord of said stringer is loosely extended, said body being slidably movable over the length of said cord, each of said closed eyelets being in outward extension of said arm member and perpendicular to the longitudinal axis of said body, and longitudinally extending hook link means formed on said body intermediate said arm members.

2. For use with a fish stringer having a cord or the like, hook means and means connecting the hook means to said stringer comprising an elongated rod-like body having an integrally connected arm member on each end thereof and in perpendicular extension therefrom, a circular, substantially closed eyelet formed on the end of each arm member extending outwardly therefrom in substantial perpendicular relationship thereto through which said cord is loosely extended, said body being slidably movable over the length of said cord, longitudinally extending hook link means formed on said body intermediate said arm member, said arm members and hook link means extending outwardly on opposite sides of said rod-like body.

3. For use with a fish stringer having a cord or the like, hook means and means connecting the hook means to said stringer comprising an elongated rod-like body having an integrally connected arm member on each end thereof and in perpendicular extension therefrom, a circular, substantially closed eyelet formed on the end of each arm member extending outwardly therefrom in substantial perpendicular relationship thereto through which said cord is loosely extended, said body being slidably movable over the length of said cord, a longitudinally extending substantially closed eyelet formed on said body intermediate said arm members and adapted to linkably connect said hook means to said fish stringer, said arm members and longitudinally extending eyelet extending outwardly on opposite sides of said rod-like body.

References Cited in the file of this patent

UNITED STATES PATENTS

| | | |
|---|---|---|
| 1,475,891 | Simpson | Nov. 27, 1923 |
| 1,713,779 | Overton | May 21, 1929 |
| 1,975,754 | Pflueger | Oct. 2, 1934 |
| 2,662,257 | Milan et al. | Dec. 15, 1953 |
| 2,708,538 | Matras | May 27, 1955 |
| 2,760,700 | Lien | Aug. 28, 1956 |